(12) United States Patent
Chatani

(10) Patent No.: US 8,108,509 B2
(45) Date of Patent: Jan. 31, 2012

(54) ALTERING NETWORK TRANSMITTED CONTENT DATA BASED UPON USER SPECIFIED CHARACTERISTICS

(75) Inventor: Masayuki Chatani, Foster City, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 1050 days.

(21) Appl. No.: 09/846,115

(22) Filed: Apr. 30, 2001

(65) Prior Publication Data

US 2002/0161882 A1 Oct. 31, 2002

(51) Int. Cl.
*G06F 15/173* (2006.01)
*G06F 15/16* (2006.01)

(52) U.S. Cl. ........ 709/224; 709/202; 709/206; 709/218; 704/258; 704/275

(58) Field of Classification Search .......... 709/202–206, 709/217–219, 223–224, 231, 246; 704/2–5, 704/258, 277, 275, 1, 200, 200.1, 207, 9
See application file for complete search history.

(56) References Cited

U.S. PATENT DOCUMENTS

| | | | |
|---|---|---|---|
| 4,021,613 A | 5/1977 | Kennedy | 179/1 |
| 4,218,585 A | 8/1980 | Carver | 179/1 |
| 4,489,432 A | 12/1984 | Polk | 381/24 |
| 4,624,012 A | 11/1986 | Lin et al. | 381/51 |
| 4,864,626 A | 9/1989 | Yang | 381/61 |
| 5,187,735 A | 2/1993 | Herrero Garcia et al. | 379/88 |
| 5,303,343 A | 4/1994 | Ohya et al. | 395/200 |
| 5,307,442 A | 4/1994 | Abe et al. | 395/2.79 |
| 5,347,306 A | 9/1994 | Nitta | |
| 5,391,946 A | 2/1995 | Yamazaki et al. | 327/113 |
| 5,479,491 A | 12/1995 | Herrero Garcia et al. | 379/88 |
| 5,511,112 A | 4/1996 | Szlam | 379/88 |
| 5,524,137 A | 6/1996 | Rhee | 379/67 |
| 5,572,625 A * | 11/1996 | Raman et al. | 704/260 |
| 5,617,407 A | 4/1997 | Bareis | |
| 5,689,618 A | 11/1997 | Gasper et al. | 395/2.85 |
| 5,784,468 A | 7/1998 | Klayman | 381/24 |
| 5,822,438 A | 10/1998 | Sekine et al. | 381/17 |
| 5,847,303 A | 12/1998 | Matsumoto | 84/610 |
| 5,875,427 A | 2/1999 | Yamazaki | 704/258 |
| 5,889,223 A | 3/1999 | Matsumoto | 84/609 |
| 5,949,854 A | 9/1999 | Sato | 379/88.16 |
| 5,950,167 A | 9/1999 | Yaker | 704/275 |
| 5,956,485 A | 9/1999 | Perlman | |

(Continued)

FOREIGN PATENT DOCUMENTS

EP 0696018 A2 * 7/1996

(Continued)

*Primary Examiner* — Bharat Barot
(74) *Attorney, Agent, or Firm* — Martine Penilla Group, LLP

(57) ABSTRACT

A system for converting content data transmitted over a computer network from a first computer to a second computer is disclosed. Content data comprising text or audio data is input into the first computer. The content data is digitized to produce digitized content data. If the content data comprises audio data, the data is digitized through a speech to text process. Parameters controlling the modification of the digitized content data are received from a user of a second computer. The parameters are input into a graphical user interface provided for the user and dictate output voice characteristics such as, gender, expression, accent, and language. The digitized content data is altered in accordance with the content data output characteristics specified by the user, and then provided to the second computer for output as modified voice data.

35 Claims, 7 Drawing Sheets

U.S. PATENT DOCUMENTS

| | | | | |
|---|---|---|---|---|
| 5,963,907 | A | 10/1999 | Matsumoto | 704/270 |
| 6,005,870 | A | 12/1999 | Leung et al. | 370/466 |
| 6,026,400 | A | 2/2000 | Suzuki | 707/6 |
| 6,031,961 | A | 2/2000 | Kim | 386/83 |
| 6,061,718 | A | 5/2000 | Nelson | 709/206 |
| 6,122,290 | A | 9/2000 | Kawamata | 370/466 |
| 6,125,115 | A * | 9/2000 | Smits | 370/389 |
| 6,138,036 | A | 10/2000 | O'Cinneide | 455/557 |
| 6,144,938 | A | 11/2000 | Surace et al. | 704/257 |
| 6,188,985 | B1 * | 2/2001 | Thrift et al. | 704/275 |
| 6,282,507 | B1 * | 8/2001 | Horiguchi et al. | 704/3 |
| 6,385,586 | B1 * | 5/2002 | Dietz | 704/277 |
| 6,389,114 | B1 * | 5/2002 | Dowens et al. | 379/52 |
| 6,408,327 | B1 * | 6/2002 | McClennon et al. | 709/204 |
| 6,453,280 | B1 * | 9/2002 | Yang | 704/4 |
| 6,462,767 | B1 * | 10/2002 | Obata et al. | 348/14.08 |
| 6,539,354 | B1 * | 3/2003 | Sutton et al. | 704/260 |
| 6,559,863 | B1 * | 5/2003 | Megiddo | 715/753 |
| 6,618,704 | B2 * | 9/2003 | Kanevsky et al. | 704/271 |
| 6,654,722 | B1 * | 11/2003 | Aldous et al. | 704/270.1 |
| 6,708,153 | B2 * | 3/2004 | Brittan et al. | 704/260 |
| 6,779,024 | B2 * | 8/2004 | DeLaHuerga | 709/217 |
| 6,901,360 | B1 * | 5/2005 | Dymetman et al. | 704/2 |
| 7,223,912 | B2 * | 5/2007 | Nishimoto et al. | 84/609 |
| 7,249,197 | B1 * | 7/2007 | Roestenburg et al. | 709/217 |
| 7,519,661 | B2 * | 4/2009 | Slotznick | 709/206 |

FOREIGN PATENT DOCUMENTS

| | | |
|---|---|---|
| EP | 0 843 168 | 5/1998 |
| JP | 10-133852 | 5/1998 |
| JP | 10-207684 | 8/1998 |
| JP | 10-304088 | 11/1998 |
| JP | 11-175081 | 7/1999 |

* cited by examiner

ALTERING NETWORK TRANSMITTED CONTENT DATA BASED UPON USER SPECIFIED CHARACTERISTICS

FIELD OF THE INVENTION

The present invention relates generally to computer networks, and more specifically, to a system for transforming data transmitted over a network through characteristics specified by a user.

BACKGROUND OF THE INVENTION

The basic functions of a computer network are to transmit, exchange or store data transmitted among computers coupled to the network. Most network implementations use a computer network simply as a point-to-point system to route and channel information among the networked computers. Some processes, such as compression or encryption techniques that speed transmission rates or enhance transmission security may be implemented on the transmitted data. In general, however, relatively little processing is performed on most data once it is transmitted from the sending terminal. Data is typically processed at the sending terminal and transmitted to the receiving terminal in its processed form. Standard network transmission systems therefore do not provide flexibility or opportunity for a receiver or third party to transform or process the data according to the receiving party's needs.

Present communication systems also typically do not provide effective mechanisms in which the relative location of various users is reflected in the audio output of characters representing the users in a networked game or other application.

What is needed, therefore, is a system that allows transmitted content data to be processed or transformed according to a receiver's needs after it has been generated and transmitted by a sending terminal.

SUMMARY AND OBJECTS OF THE INVENTION

It is an object of embodiments of the present invention to provide an improved content data output system that enhances interactive computer applications, such as networked video games and chat applications.

It is a further object of embodiments of the present invention to provide audio output that reflects the relative physical location of users as they are distributed in the network.

A system for converting content data transmitted over a computer network from a first computer to a second computer is disclosed. Content data comprising text or audio data is input into the first computer. The content data is digitized to produce digitized content data. If the content data comprises audio data, the data is digitized through a speech to text process. Parameters controlling the modification of the digitized content data are received from a user of a second computer. The parameters are input into a graphical user interface provided for the user and dictate output voice characteristics such as, gender, expression, accent, and language. The digitized content data is altered in accordance with the content data output characteristics specified by the user, and then provided to the second computer for output as modified voice data. In one embodiment, the relative location information of the users in a network is determined. This location information is used to further modify the audio output from characters representing the users.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE PREFERRED EMBODIMENT

A data conversion system for processing downloaded content over a computer network is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Aspects of the present invention may be implemented on one or more computers executing software instructions. According to one embodiment of the present invention, server and client computer systems transmit and receive data over a computer network or standard telephone line. The steps of accessing, downloading, and manipulating the data, as well as other aspects of the present invention are implemented by central processing units (CPU) in the server and client computers executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers.

Figure 1:
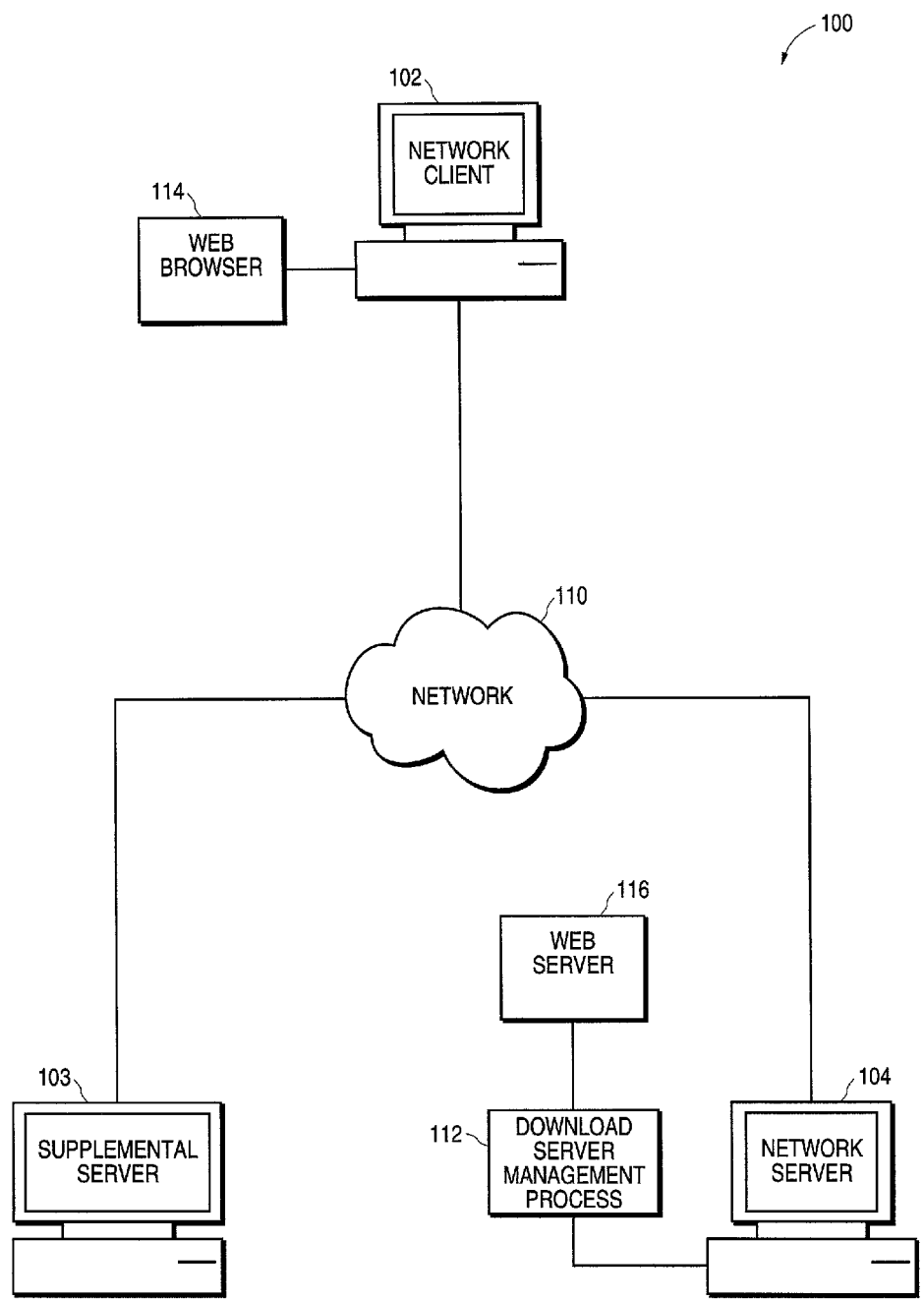
FIG. 1 illustrates a block diagram of a computer network system that implements embodiments of the present invention.

FIG. 1 is a block diagram of a computer network system that can be used to implement a data transmission and conversion, according to one embodiment of the present invention. The system 100 of FIG. 1 enables the transmission and conversion of content data. The term "content data" in the context of the specification and claims shall be understood to refer to any type of downloadable data, which may consist of any one of text data, video linear streaming data, such as motion picture data in MPEG or MPEG2 format; linear audio streaming data, such as music data in MP3 format; binary program data; voice data; or any combination of such data or similar data. In general, content data does not include services or data that are used solely to provide access to a network, such as browser software or protocol handlers whose main function is only to establish a network connection.

FIG. 1 illustrates a computer network system 100 that implements one or more embodiments of the present invention. In system 100, a network server computer 104 is coupled, directly or indirectly, to one or more network client computers 102 through a network 110. The network interface between server computer 104 and client computer 102 may also include one or more routers. The routers serve to buffer and route the data transmitted between the server and client computers. Network 110 may be the Internet, a Wide Area Network (WAN), a Local Area Network (LAN), intranet, extranet, wireless network, or any combination thereof.

In one embodiment of the present invention, the server computer 104 is a World-Wide Web (WWW) server that stores data in the form of 'web pages' and transmits these pages as Hypertext Markup Language (HTML) files over the Internet network 110 to one or more of the client computers 102. For this embodiment, the client computer 102 runs a "web browser" program 114 to access the web pages served by server computer 104. Additional web based content can be provided to client computer 102 by separate content providers, such as supplemental server 103.

In one embodiment of the present invention, server 104 in network system 100 includes a download service management process 112 that is configured to handle download requests from a user. Access to the server 104, which may comprise one of several servers, is facilitated typically through a router on network 110 which directs requests to the download management server. When the server 104 receives requests from a user, the server executes a download of requested content from a contents database that is stored internally or externally to the server. Along with processing requests for downloading of content data, the server 104 may also retrieve the requesting user's customer data from a customer database and attach it to the requested primary contents or use it to modify content or transmission parameters for particular users. This data is then transmitted via the network 110 by means of a known networking protocol standard, such as the file transfer protocol (ftp).

In one embodiment of the present invention, wherein network 110 is the Internet, network server 104 also executes a web server process 116 to provide HTML documents to client computers coupled to network 110. To access the HTML files provided by server 104, client computer 102 runs a web client process (typically a web browser) 114 that accesses and provides links to web pages available on server 104 and other Internet server sites. It should be noted that a network system 100 that implements embodiments of the present invention may include a larger number of interconnected client and server computers than shown in FIG. 1.

The network 110 is normally a bi-directional digital communications network that connects the user's terminal hardware with the download management server provided on the server side of the system. With current technologies, a CATV (cable television) bi-directional network, ISDN (Integrated Services Digital Network), DSL (Digital Subscriber Line), or xDSL high-speed networks are examples of existing network infrastructures enabling the necessary network connections for implementing embodiments of the present invention.

The client computer of system 100 may comprise a personal computer that includes a modem or network adapter, or it may comprise a networked game console (entertainment system) that utilizes a detachable storage medium therein, and a TV monitor or any other suitable display device connected to the game console. The modem or network adapter is a device that is used to connect the client's terminal hardware, e.g., a game console, for connection to the network 110. For example, if network 110 is a CATV network, the modem may be implemented as a cable modem device; and if network 110 is an ISDN network, the modem may be implemented as a terminal adapter.

The server can supply digital content such as voice data, music clips, full-length audio and video programs, movies, still picture data, and other similar types of content. The content might further comprise promotional or advertising data associated with the primary content, such as movie previews, demo games, sample data, and other similar types of content.

In one embodiment, network system 100 includes a conversion system that transforms or processes the data transmitted from the server to the client to improve the user interface and quality of entertainment. For the embodiment in which the transmitted data comprises voice data, the conversion system can be used in various IP telephony, network chat, video game, or 3D virtual chat applications, among others.

Figure 2:
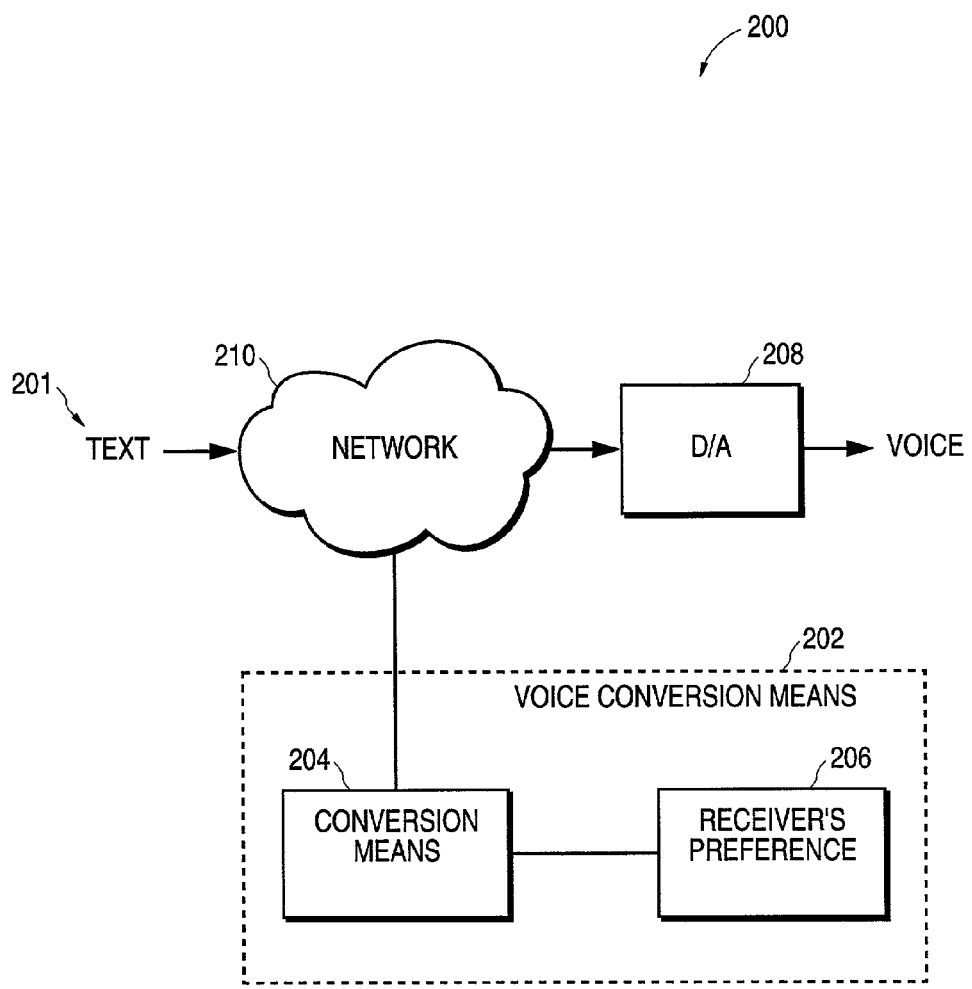
FIG. 2 illustrates a block diagram of a network that includes a content data conversion process for text data, according to an embodiment of the present invention.

FIG. 2 illustrates a block diagram of a network that includes a content conversion process, according to one embodiment of the present invention. For the embodiment illustrated in FIG. 2, the data transmitted from the server comprises text data 201 generated by a server computer and transmitted to a client computer over a network 210. The text data is output converted into voice output through a digital-to-analog (D/A) converter 208 coupled to the client computer. The conversion system 202 includes a conversion process 204 and a receiver preference database 206. In one embodiment, the conversion system 202 is resident within the client computer. Alternatively, the conversion system 202 can be included within a separate computer coupled to the network and the client computer.

The conversion process 204 includes circuits or processes that convert the input text data to output data, as well as processes that modify or transform the characteristics of the text data. For example, for voice output, the conversion process can be used to control various characteristics such as, tone, accents, intonation, and effects, such as echo, reverberation, and so on. For speech output, the conversion process can control characteristics such as language, dialect, expression, and so on. For example, the conversion process 204 may include a translator that translates speech in one language to another language. The conversion process can also include processes that mimic the voice characteristics of well-known characters or personalities.

Figure 3:
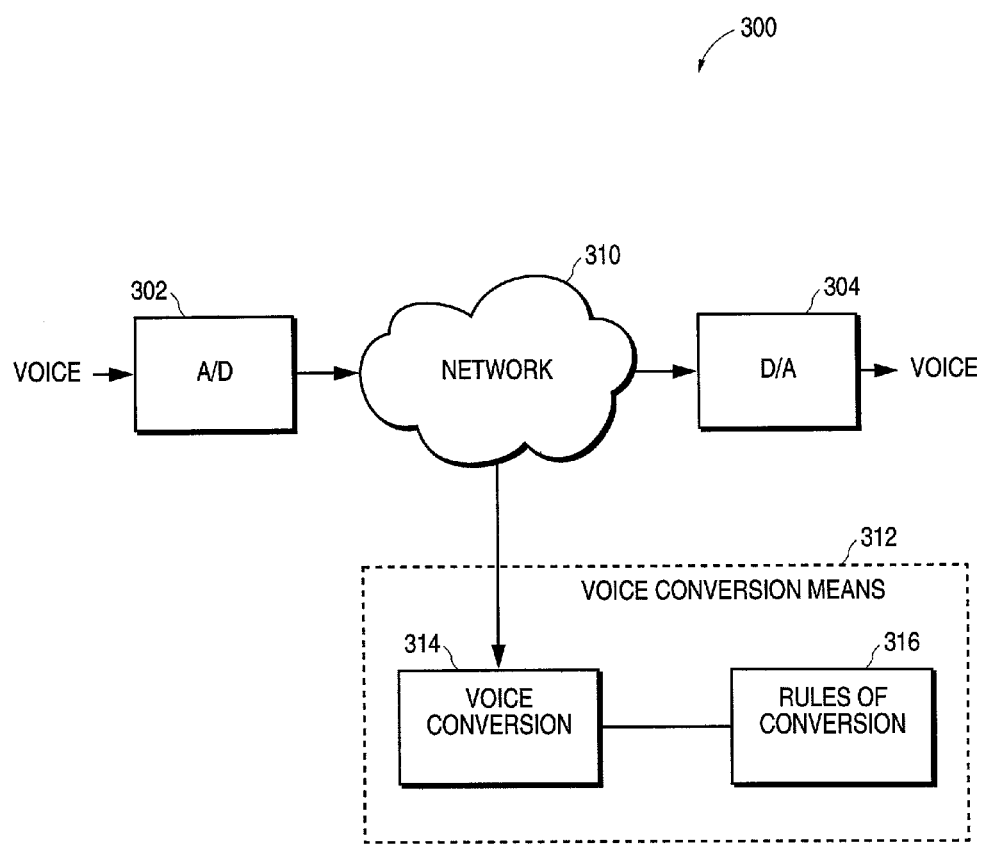
FIG. 3 illustrates a block diagram of a network that includes a content data conversion process for voice data, according to an embodiment of the present invention.

FIG. 3 illustrates a block diagram of a network that includes a content conversion process for content data that comprises voice data, according to one embodiment of the present invention. For the embodiment illustrated in FIG. 3, the data transmitted from the server comprises voice data generated by a server computer and transmitted to a client computer over a network 310. The voice data 302 is first input through an analog-to-digital (A/D) converter 302 for conversion into digital form. The voice packets can be addressed in one of several ways, including Unicast, Multicast, or broadcast format.

Alternatively, if the voice data includes data that is first input into the server computer, the data can be digitized prior to input to the server computer. For example, a microphone or other input means may include an A/D converter to convert the voice data to digital form prior to input to the server computer. The digitized voice data is then transmitted over network 310 for further processing by voice conversion means 312.

The voice of the transmitted data can be changed and sent to other assigned user(s) over the network using a protocol such as Voice over IP (VoIP). The voice can be changed based on various factors such as virtual character talk parameters, or user provided preferences. The digitized voice data is transformed into output voice data at the client computer through digital-to-analog (D/A) converter 304. The digitized voice data output from A/D converter 302 is processed through conversion system 312. The conversion system 312 includes a voice conversion process 314 and a conversion rules database 316. Alternatively, the digitized voice data can be converted to analog form after output from the client computer through an external D/A converter. Such a D/A converter may be incorporated into speaker, headphone, or other sound output systems that receive digital audio output from the client computer.

Figure 4:
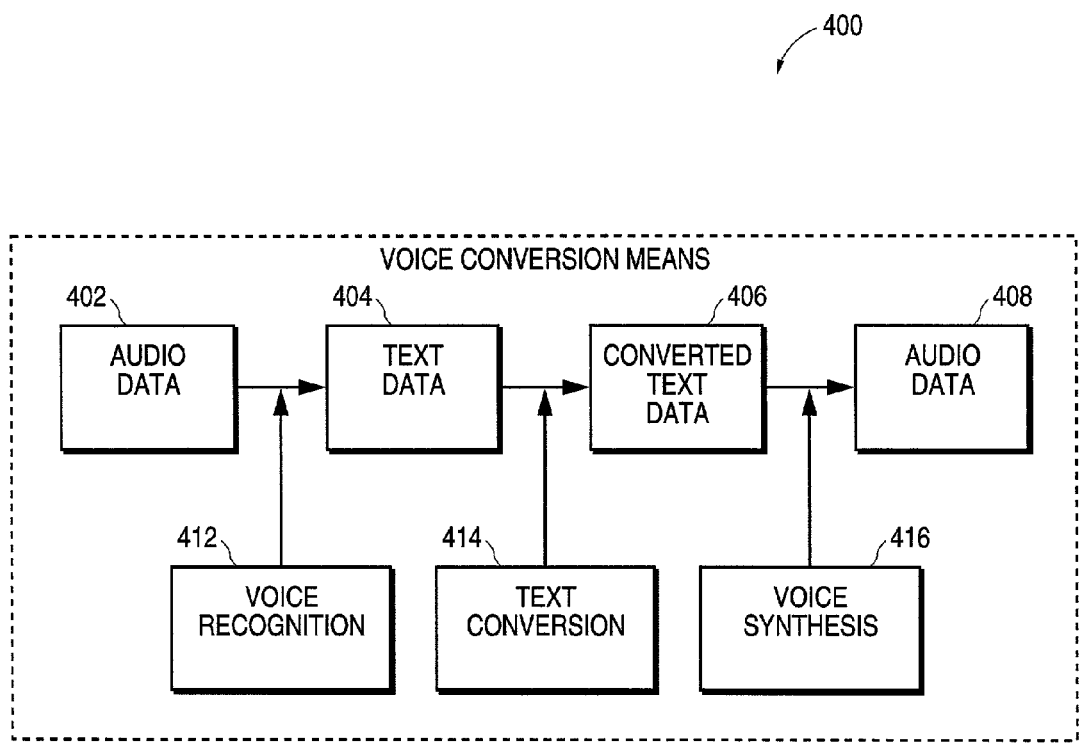
FIG. 4 is a flow diagram illustrating the processing of data through the voice conversion process illustrated in FIG. 3, according to one embodiment of the present invention.

The voice conversion process 314 comprises processes that alter or modify the digitized voice data output from A/D converter 302 in the server computer into converted voice data to be output from D/A converter 304 on the client computer. FIG. 4 illustrates the basic flow of data through the voice conversion process illustrated in FIG. 3, according to one embodiment of the present invention. In flow diagram 400, audio data 402 represents the digitized voice data that is output from A/D converter after input into the server computer through an input device, such as a microphone. The digitized audio data 402 is converted into text data 404 through a voice recognition process that converts digitized audio data to equivalent digital text data. The text data 404 is then processed by a text conversion process 414 to produce converted text data 406. This converted text data 406 is then processed through a voice synthesis process 416 to produce audio data 408. The audio data 408 comprises digital audio data that is input to D/A converter 304 for conversion to analog voice to be output through speakers on the client computer.

The text conversion process 414 includes several sub-processes that alter the original voice data to change the voice as it is played back on the client computer. Such changes can include modification of the original voice tone, accent, intonation, and so on. The text conversion process can also include processes that alter the substance of the input data, such as language translation (e.g., English-French) or dialect translation. Primarily, the text conversion process alters the expression of the original voice data. The expression shows a character's personality or attribute (e.g., male or female or child speaker), character's circumstance or environment (e.g., in a tunnel, cave, etc.), the character's condition (e.g., excited, sad, injured, etc.). The text conversion process can also include special effects that alter the input voice data, such as Doppler effect, echo, and so on.

In one embodiment of the present invention, the characteristics that dictate how the voice data is converted are provided by a conversion rules process 316. The rules process 316 specifies several parameters used by the voice conversion process 314 that are used to alter the input voice data. The voice rules process 316 includes user provided character profiles. In one embodiment, the character profiles are entered by the user through a user interface provided on the client computer.

The character profile can be used to tailor the voice that a displayed character speaks with in applications such as video games, educational programs, interactive applications, text-to-speech programs, and the like. The character talking voice is determined by fundamental parameters, such as frequency, waveform, etc.). The voice conversion process shapes the basic waveform to produce a converted voice that corresponds to the selected character profile. In one embodiment, a user can set the profile for the character.

Figure 5:
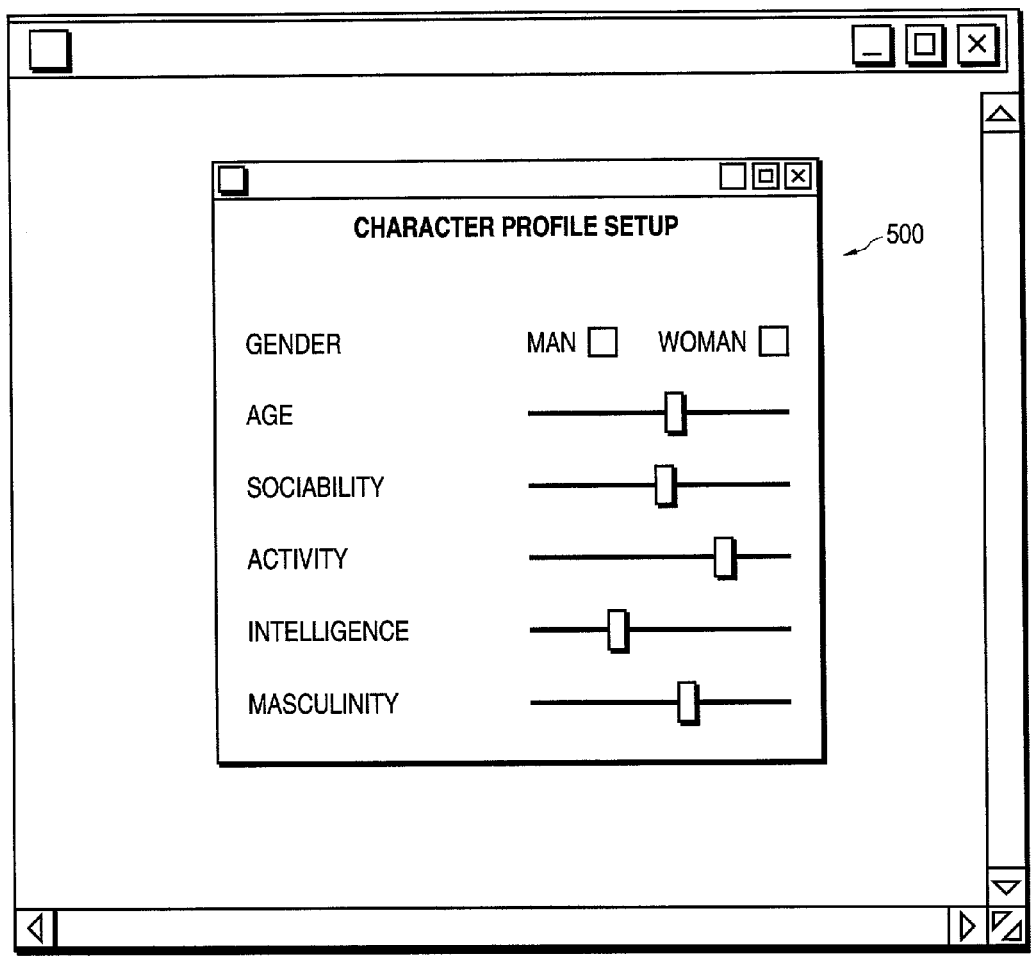
FIG. 5 illustrates a character profile setup input screen displayed in a graphical user interface system, according to one embodiment of the present invention.

FIG. 5 illustrates a graphical user screen that illustrates a character profile input display. The character profile set up display window 500 includes several user selectable input fields that the user can change to alter the characteristics of the voice output. The user first selects the gender of the character that will recite the playback voice. As shown, the user can select a man's voice or a woman's voice. Other voice type characteristics can also be provided, such as child or baby. Various voice characteristics are also provided, such as age, sociability, activity, intelligence, and masculinity. Each of these characteristics shapes the voice playback parameters. For example, choosing an older age or increasing the masculinity generally lowers the voice. The sociability, activity, and intelligence characteristics generally affect how active and articulate the playback voice is portrayed.

For the embodiment illustrated in FIG. 5, the user characteristics are displayed as bar slides that the user can move through an input device, such as a mouse, to select a relative value for the respective characteristic. It should be noted that various other input methods could be provided, such as numerical value entries, percentage value entries, and the like.

In an alternative embodiment, the character's talking voice can be created based on each pre-set characters profile. For this embodiment, the rules process 316 can include a user specified database that stores certain parameters or data entries for various variables of the voice data. For example, database parameters could include values that dictate the gender of the output voice, language, expression, and so on. Through the use of such a database, the voice data output on the client computer could, for example, be set to speak in English in a male voice with an English accent.

Figure 6:
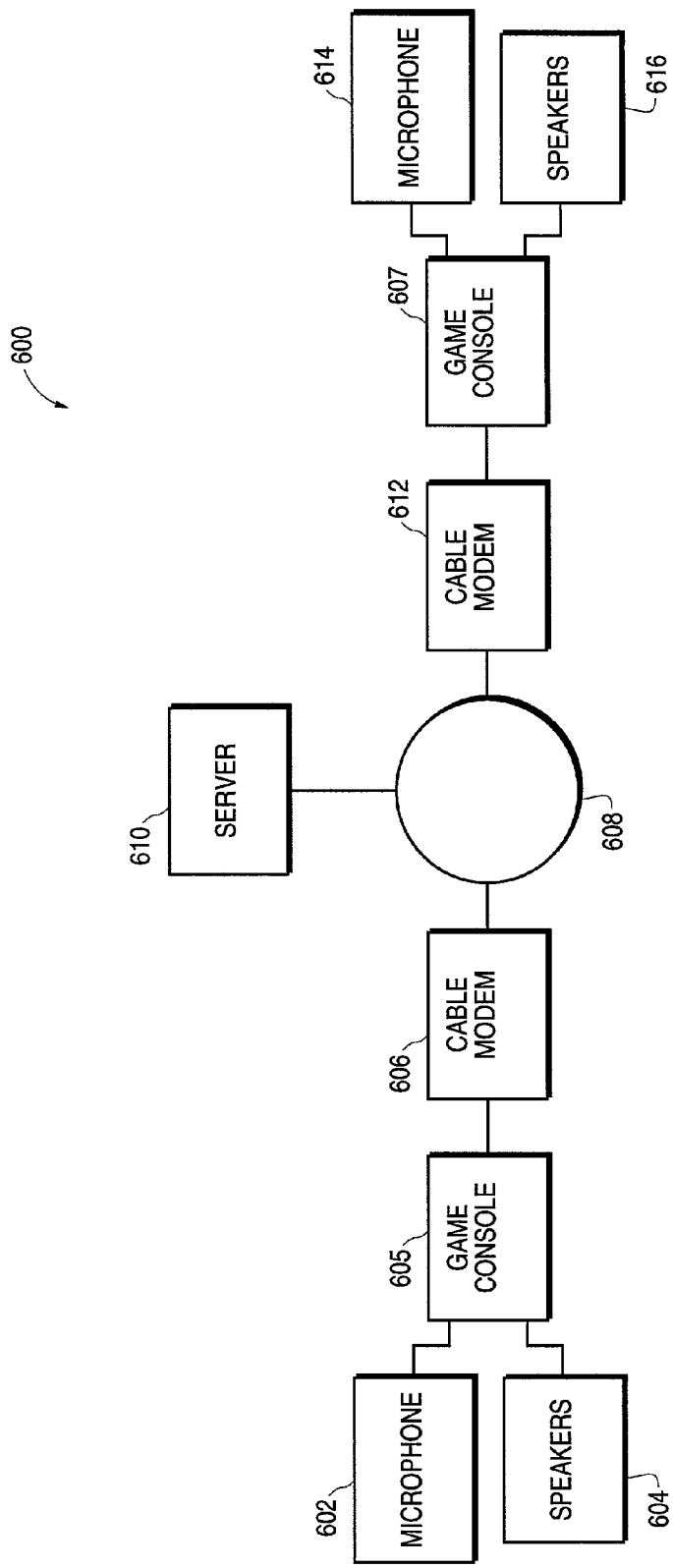
FIG. 6 illustrates a networked game environment in which user game consoles communicate over a network, according to one embodiment of the present invention.

In one embodiment of the present invention, the voice conversion process is implemented in a distributed interactive game system comprising a plurality of networked games coupled among two or more users. FIG. 6 illustrates a networked game environment in which user game consoles communicate over a network, according to one embodiment of the present invention. A first user game console 605 is coupled to network 608 through a cable modem 606. For this embodiment, network 608 is typically a cable TV (CATV) network. Also coupled to game console 605 is a speaker pair 604 for voice output, and a microphone 602 for voice input. A second user game console 607 is coupled to network 608 through a cable modem 612. A microphone 614 and speaker pair 616 is coupled to the game console 607.

In system 600, a server computer 610 may be coupled to network 608. The server computer can perform a variety of functions, such as game monitoring, providing game or application programs, managing user accounts, and the like.

Figure 7:
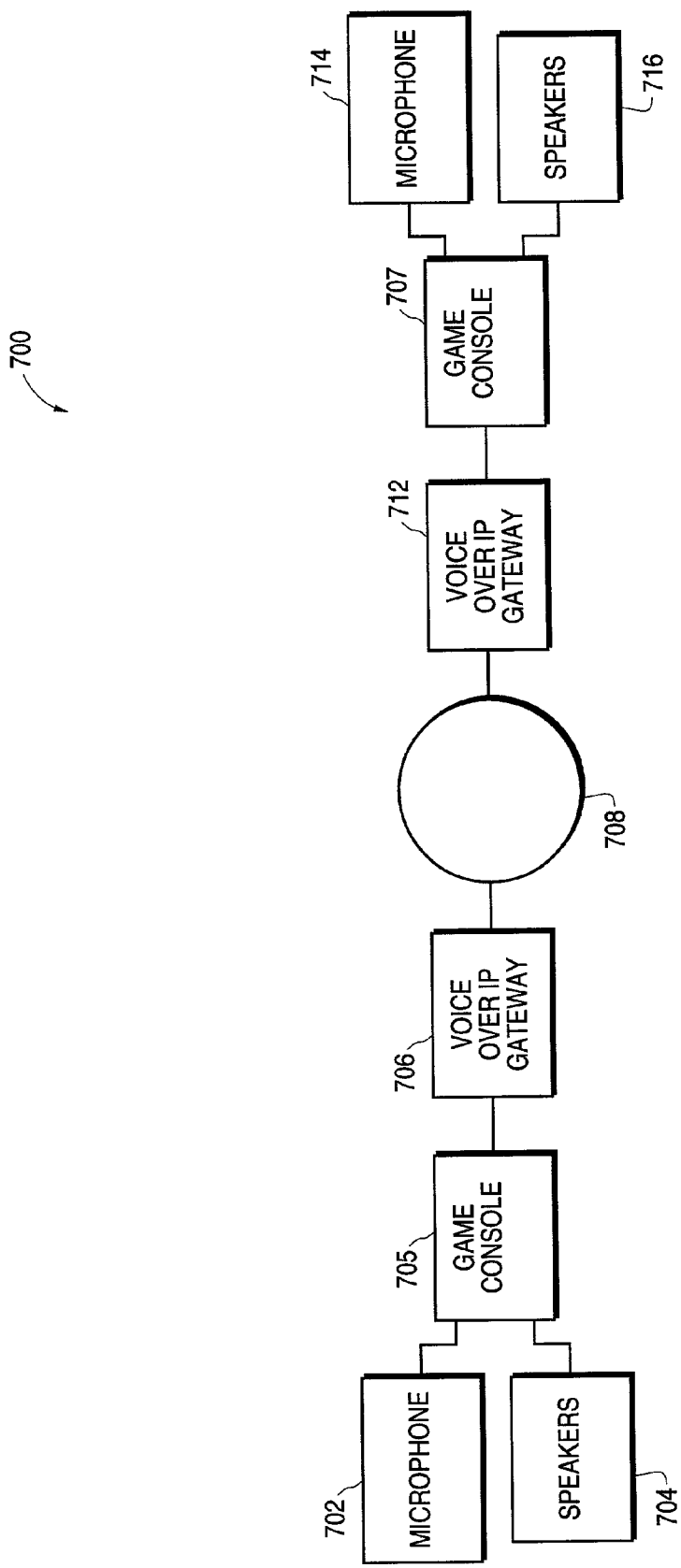
FIG. 7 illustrates a networked game environment in which user game consoles communicate over a network, according to an alternative embodiment of the present invention.

FIG. 7 illustrates a networked game environment in which user game consoles communicate over a network, according to one embodiment of the present invention. For system 700, the network 708 comprises the Internet, and the first game console 705 is coupled to the second game console 707 through Voice over IP gateways 706 and 712. Each game console is attached to a speaker 704, 716, and microphone 702 and 714 set, respectively.

For the embodiments illustrated in FIGS. 6 and 7, the output voice characteristic depends upon user information. In this manner, each user participant (player) can have a different voice assigned to his character or terminal. It is assumed that each user controls a character that is displayed on the terminal of each game console. The characteristics of the character's voice can then be determined based on the location of the user to whom the character belongs. For example, assuming each game console has a left and right pair of speakers, the output voice volume ratio of the speaker pair is set based on the direction of the sender location. This provides some spatial effect of the voice relative to the location of the speaking character. The volume can also be changed based on the distance between the sender and the receiver. Alternatively, when a plurality of users is communicating with one another, each user's voice is assigned to each speaker based on their location.

The user location determination process is included in the voice conversion process as a means of altering the voice of a character played back on a user game console. In this process, the direction or/and distance between the sender and the receiver is calculated and the volume ratio of the left-right speaker pair is set based on the calculated data. In the case of surround-sound environment in which multiple speakers are coupled to a console, the other speakers are also considered.

In one embodiment, user location information for a plurality of networked game players is determined by using address information for each of the players. Address information can be stored in a database provided in each game console.

The address or location information may be provided by using the telephone number for each player. In this case, the area code provides a rough approximation of a user's location relative to the other users. An address database related to telephone numbers is stored in the memory of each terminal. A particular user's terminal receives a sender's telephone number and retrieves the location based on the telephone number. Using the retrieved location data and the user's own location data, the receiver terminal calculates the direction or/and distance.

In an alternative embodiment, the location information can be provided using a personal database stored in each game console memory (e.g., secondary memory). For this case, each user has to input the other user's addresses in advance. Zip code information could be used to provide reasonable approximations of user locations. The information is stored in a memory location of the game console. When a connection between users is established, ID information (e.g., user ID, telephone No., etc.) is sent to each user. Using the ID information, the user location is retrieved in each personal database and the direction and/or distance is calculated based on the user location.

Instead of storing user location information in each game console, the address information for a group of networked users can be stored in a central server, such as server 610 in FIG. 6. For this embodiment, the server stores the addresses or location information (zip code, area code, etc.) for all of the users in a database. The direction and/or the distance are calculated based on the stored user information in the server. The server sends each user direction and/or distance information for the other users. Each individual user terminal then sets the volume ratio or whole volume based on the location information. For this embodiment, voice data is sent to each user through the server.

It should be noted that the process of altering the data in accordance with output voice characteristics can be implemented either in the server (data sending) computer, the client (data receiving) computer, or a network server computer coupled to the server and client computer. Each computer capable of altering the transmitted data would have associated with it a voice or text conversion means, such as that illustrated in FIG. 4. Such a conversion means could be implemented in hardware circuitry coupled to the computer, a software program executed by the computer, or a combination of dedicated hardware and software processes. Moreover, the database storing the various voice characteristics for each associated client computer or character within a client computer can be stored locally in each client computer or centrally in a database accessible to a network server computer.

Depending upon where the output alteration process is performed, the steps of transmitting, altering, and receiving the data can be done in various different step sequences. For example, the data can be first transmitted from the server computer, altered in the server or other computer, and then received by the client computer. If the alteration process is performed by the client computer, the process can be performed by first transmitting the data from the server computer to the client computer, receiving the data in the client computer, and then altering the data in accordance with the specified output characteristics.

Besides game or entertainment programs, the voice conversion process described in relation to FIGS. 6 and 7 can be used in various other applications involving speech content transmitted among a plurality of users. Examples include chat room applications, Internet telephony, and other similar applications.

In the foregoing, a system has been described for modifying transmitted content data based on user preferences. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of modifying content data transmitted from a first computer to a second computer over a bi-directional communications network, comprising:

specifying content data output characteristics to be associated with the content data upon output by the second computer;

transmitting the content data from the first computer to the second computer over the bi-directional communications network; and altering the content data that is to be output by the second computer in accordance with the content data output characteristics specified through the first computer, the output characteristics identifying an expression to be applied to the content data, and the altering includes converting an audio component of the content data to text data through a voice recognition process, the text data being processed into converted text data, and the converted text data being synthesized into audio data that includes the applied expression that does not perform language translation.

2. The method of claim 1, further comprising the steps of:
receiving the content data in the first computer; and
outputting the altered content data from the second computer.

3. The method according to claim 2, wherein the content data output characteristics include location information of the first and second computers, the location information affects the altering of the content data.

4. The method according to claim 2, wherein the received content data comprises voice data input into the first computer.

5. The method according to claim 4, wherein the altered content data being transmitted for output through speakers coupled to the second computer.

6. The method according to claim 5, wherein the content data output characteristics include at least one of character gender, character condition, and character environment.

7. The method according to claim 5, wherein the content data output characteristics are defined by input received by the first computer through a user interface.

8. The method according to claim 5, wherein the content data output characteristics are defined by input received by the second computer through a user interface.

9. The method according to claim 5, wherein the content data output characteristics are stored in a database residing in a memory storage coupled to the second computer.

10. The method of claim 5, wherein the first and second computers are coupled to audio speakers, and wherein the content data output characteristics comprise an audio output ratio for outputting content data from the audio speakers.

11. The method of claim 5, wherein the location information for the first and second computers are respectively obtained from the first and second computers.

12. The method of claim 5, wherein the location information for the first and second computers are respectively determined by the physical location of the first and second computers.

13. A method of modifying content data transmitted from a first computer to a second computer over a bi-directional communications network, comprising:
specifying content data output characteristics to be associated with the content data upon output by the second computer, the content data output characteristics defined by an applied expression, the applied expression not performing language translation but including at least one of character gender, character condition, and character environment;
transmitting the content data from the first computer to the second computer over the bi-directional communications network;
altering the content data that is to be output by the second computer in accordance with the content data output characteristics that are defined by the applied expression, the altering of content data further includes converting an audio component of the content data to text data through a voice recognition process, the text data being processed to converted text data, and the converted text data being synthesized to audio data;
wherein the first computer is coupled to a plurality of client computers over an interactive network, and wherein each user of a client computer is associated with a character represented in a program executed on each computer, each character having associated therewith a specific content data output characteristic, the method further including,
determining a relative location of each character in an environment defined by the program; and
altering the specific output characteristics of the audio output depending upon the relative location of each character associated with each of the users.

14. The method of claim 13, wherein each of the client computers includes a left and right speaker pair, and wherein the content data output characteristics comprise a relative audio output ratio for outputting altered content data from the left and right speakers.

15. A system configured to modify content data transmitted from a first computer to a second computer over a bi-directional communications network, the system comprising:
means for specifying content data output characteristics to be associated with the content data upon output by the second computer;
means for transmitting the content data from the first computer to the second computer over the bi-directional communications network; and
means for altering the content data that is to be output by the second computer in accordance with the content data output characteristics specified through the first computer, the output characteristics identifying an expression to be applied to the content data, the applying of the expression not performing language translation, and the means for altering content data includes a voice recognition means for converting an audio component of the content data into text data, a text conversion means for processing the text data to converted text data, and a voice synthesis means to synthesize the converted text data to audio data that includes the applied expression.

16. The system of claim 15, further comprising:
means for receiving content data in the first computer;
means for transmitting the altered content data to the second computer over the bi-directional communications network; and
means for outputting the altered content data from the second computer.

17. The system according to claim 16, wherein the received content data comprises voice data input into the first computer, and wherein the audio data of the altered content data being transmitted through audio speakers coupled to the second computer.

18. The system according to claim 17, wherein the content data output characteristics include at least one of character gender, character condition, and character environment.

19. The system according to claim 18, further comprising graphical input means for receiving content data output characteristics input through the second computer.

20. The system according to claim 18, further comprising graphical input means for receiving content data output characteristics input through the first computer.

21. The system of claim 20, wherein the content data output characteristics comprise an audio output ratio for outputting altered content data from the audio speakers coupled to the second computer.

22. A server computer coupled to one or more client computers over a bi-directional communications network, comprising:
- a circuit to transmit content data to a computer of the one or more client computers over the bi-directional communications network;
- a circuit to specify content data output characteristics to be associated with the content data upon output by the computer; and
- a circuit to alter the content data that is to be output by the computer in accordance with the content data output characteristics, the content data output characteristics identifying an expression to be applied to the content data and applying the expression does not include performing language translation, the circuit to alter the content data includes voice recognition circuitry to convert an audio component of the content data to text data, circuitry to process the text data to converted text data, and circuitry to synthesize the converted text data to audio data.

23. The server computer of claim 22, further comprising:
- a circuit to receive the content data; and
- a circuit to transmit the altered content data to the computer over the bi-directional communications network.

24. The server computer of claim 23, wherein the received content data comprises voice data input into a first computer.

25. The server computer according to claim 24, wherein the content data output characteristics include parameters that alter the content data associated with audio output from the computer, the content data output characteristics comprising at least one of character gender, character condition, and character environment.

26. The server computer according to claim 23, wherein the bi-directional communications network comprises an interactive network, and wherein the server computer and the one or more client computers include game consoles configured to execute an interactive game.

27. The server computer according to claim 26, wherein the content data output characteristics are associated with respective characters defined by the game, each one of the respective characters is associated with a particular client computer of the one or more client computers.

28. The server computer according to claim 27, comprising:
- a circuit to determine a relative location of each one of the respective characters defined by the game; and
- a circuit to alter the content data output characteristics of the audio output depending upon the location of each one of the respective characters associated with each client computer of the one or more client computers.

29. A server computer coupled to one or more client computers over a bi-directional communications network, comprising:
- means for transmitting content data to a computer of the one or more client computers over the bi-directional communications network;
- means for specifying content data output characteristics to be associated with the content data upon output by the computer; and
- means for altering the content data that is to be output by the computer in accordance with the content data output characteristics, the content data output characteristics identifying an expression to be applied to the content data, and applying the expression does not include performing language translation, the means for altering the content data includes voice recognition means for altering an audio component of the content data to text data, means for processing the text data to converted text data, and means for synthesizing the converted text data to audio data for output in a client computer.

30. An interactive network system, comprising;
- a first computer;
- a second computer, the second computer receiving content data from the first computer, wherein the content data is altered in accordance with content data output characteristics specified by the first computer, the interactive network system further comprising,
- a voice recognition component, the voice recognition component converts an audio component of the content data to text data;
- a text conversion component, the text conversion component processes the text data to converted text data, and
- a voice synthesis component, the voice synthesis component synthesizes the converted text data to audio data for output in the second computer;
- wherein audio data to be output at the second computer includes the application of an expression alteration that does not include performing language translation.

31. An interactive network system as recited in claim 30, wherein the content data received at the second computer is altered based on content data output characteristics specified by the first computer the content data output characteristics include location information of the first and second computers, the location information at least partially affecting the altering of the content data when received at the second computer.

32. An interactive network system as recited in claim 31, wherein the location information of the first and second computers are associated with respective characters to be shown on a display of both of the first and second computers.

33. An interactive network system as recited in claim 32, wherein the characters are parts of an interactive networked game in which participation in the game is through the first and second computers.

34. An interactive network system as recited in claim 30, wherein the first and second computers are networked together and a server assists in the communication and data handling between the first and second computers.

35. A gaming system, comprising:
- a first gaming computer coupled over a gaming server to a second gaming computer, a respective game character being controlled through each of the first gaming computer and the second gaming computer,
- wherein the first gaming computer enables the definition of content data output characteristics for its respective game character;
- wherein the second gaming computer enables the definition of content data output characteristics for its respective game character, the content data output characteristics identifying an expression to be applied to the content data and applying the expression does not include performing language translation, the content data output characteristics further including instructions for converting audio data to text data through a voice recognition process, instructions for processing the text data to converted text data, and instructions for synthesizing the converted text data to audio data;
- whereby the audio data to be output at the second gaming computer being associated with its respective game character, and the second gaming computer is used in altering audio data to be output at the first gaming computer, the audio data to be output at the first gaming computer being associated with its respective game character.

* * * * *